United States Patent [19]

Toomey et al.

[11] Patent Number: 5,363,541
[45] Date of Patent: Nov. 15, 1994

[54] METHOD FOR REPAIRING A TRANSPORT PIPE

[75] Inventors: Danny D. Toomey, Broken Arrow; Gene R. Ralls, Tulsa; Johnny M. Manley, Owasso, all of Okla.

[73] Assignee: TDW Delaware, Inc., Wilmington, Del.

[21] Appl. No.: 140,592

[22] Filed: Oct. 21, 1993

Related U.S. Application Data

[62] Division of Ser. No. 970,116, Nov. 2, 1992, Pat. No. 5,280,670.

[51] Int. Cl.⁵ .................... F16L 55/16; B23P 6/00
[52] U.S. Cl. .................... 29/890.14; 29/402.11; 138/97; 285/21
[58] Field of Search ........... 29/402.16, 402.06, 402.09, 29/402.08, 402.11, 402.12, 402.13, 890.144, 890.14, 213.1, 331 T; 138/97, 99; 408/1 R, 87; 285/15, 21, 22, 41

[56] References Cited

U.S. PATENT DOCUMENTS

| | | | |
|---|---|---|---|
| 3,171,419 | 3/1965 | Black | 29/402.09 |
| 3,796,233 | 3/1974 | Lacey | 138/97 |
| 4,014,180 | 3/1977 | Kelly et al. | 29/402.11 |
| 4,049,480 | 9/1977 | Kutschke | 138/99 X |
| 4,516,593 | 5/1985 | Muto | 29/890.14 X |
| 4,756,338 | 7/1988 | Guyatt et al. | 138/99 |
| 4,986,698 | 1/1991 | Chin | 29/523 |
| 5,062,207 | 11/1991 | Martin et al. | 29/890.14 |

FOREIGN PATENT DOCUMENTS

| | | | |
|---|---|---|---|
| 3005078 | 10/1980 | Germany | 285/21 |
| 1164499 | 6/1985 | U.S.S.R. | 138/97 |

Primary Examiner—William Briggs
Attorney, Agent, or Firm—Head & Johnson

[57] ABSTRACT

This describes a method and apparatus for repairing a plastic transport pipe with a defective section while the pipe is under pressure. A pressure vessel encloses the defection section and seals with the pipe. The defective section is cut in two and the defective section drops out into the lower space of the vessel. A repair nipple is then moved into the space between the two cut ends of the pipe. Electrofusion collars are placed over the joint between the insert nipple and the cut ends of the transport pipe. The electrofusion collars are then energized to effect a leakproof joint between the insert nipple and the two ends of the transport pipe. The insert nipple may be any replacement section desired, such as a section with a Tee in it.

1 Claim, 4 Drawing Sheets

METHOD FOR REPAIRING A TRANSPORT PIPE

This is a divisional application of co-pending application Ser. No. 07/970,116 filed Nov. 2, 1992, U.S. Pat. No. 5,280,670.

FIELD OF THE INVENTION

This invention relates to a system for repairing leaks in plastic pipe that carries or transports fluids, such as methane, under pressure.

BACKGROUND OF THE INVENTION

Gas lines or pipes for transporting fluids, such as methane, over a considerable distance have been recently made of plastic material. The plastic material may be polyethylene for example. These polyethylene gas lines work well and are widely used, however, they are subject to having leaks develop in certain sections. When these leaks occur they must be repaired if the line is to be continued to be used to transport gas.

SUMMARY OF THE INVENTION

This invention includes a method and an apparatus for repairing a plastic transport pipe with a defective section therein while the pipe is under pressure. The pressure may be up to 100 psi or more, for example. The defective section of the pipe is enclosed by a pressure container or vessel that seals with the pipe.

After the defective section is sealed in the pressure vessel, cutters that are maintained within the vessel are used to cut two cuts in the pipe so that the defective section is cut out of the pipe and the severed section drops into a space within the pressure chamber. This leaves a space within the container between two cut ends of the remaining pipe.

A repair nipple has been prepared and has previously been placed in the pressure vessel. The nipple is of a length which is about the same as the distance between the two cut ends of the pipe remaining. There are two electrofusion collars placed over the nipple. The nipple is then moved by placing, or positioning, arms until the nipple fits snugly between the two ends of the pipe.

Next, the two collars are moved outwardly to fit over the two points where the collar and the transport pipe meet. Thus, each fitting between the nipple and the pipe at each end is covered by a collar. Electric heating wires within each collar are then energized. The cut ends at the transport pipe are thus fused to the insert nipple.

In some cases it may be desired to insert a Tee into the pipeline to effect a take off, even though there is no leak in the transport pipe. If that is the situation, a Tee nipple is inserted into a cutout space at the desired location and in a manner as described above. The inserted Tee would have a valve on the portion of the Tee that is perpendicular to the pipe and any desired replacement fitting may be used.

After the transport pipe has been repaired, the pressure in the vessel is relieved. After the pressure has been relieved the pressure vessel is taken from the pipe. The pipe is then completely repaired. This has been accomplished without taking the pressure off the pipeline.

It is an object of this invention to provide a system and method for repairing a leak in a plastic pipeline while that pipeline is under pressure.

It is a further object of this invention to provide a method and apparatus whereby a fluid "take-off" or other replacement fitting can be inserted into a pipeline while the pipeline is still under pressure.

These and other objects of the invention will be readily apparent and a better understanding of the invention will be had from the description which follows when taken in conjunction with the attached drawings.

Detailed Description of the Invention

Figure 1:
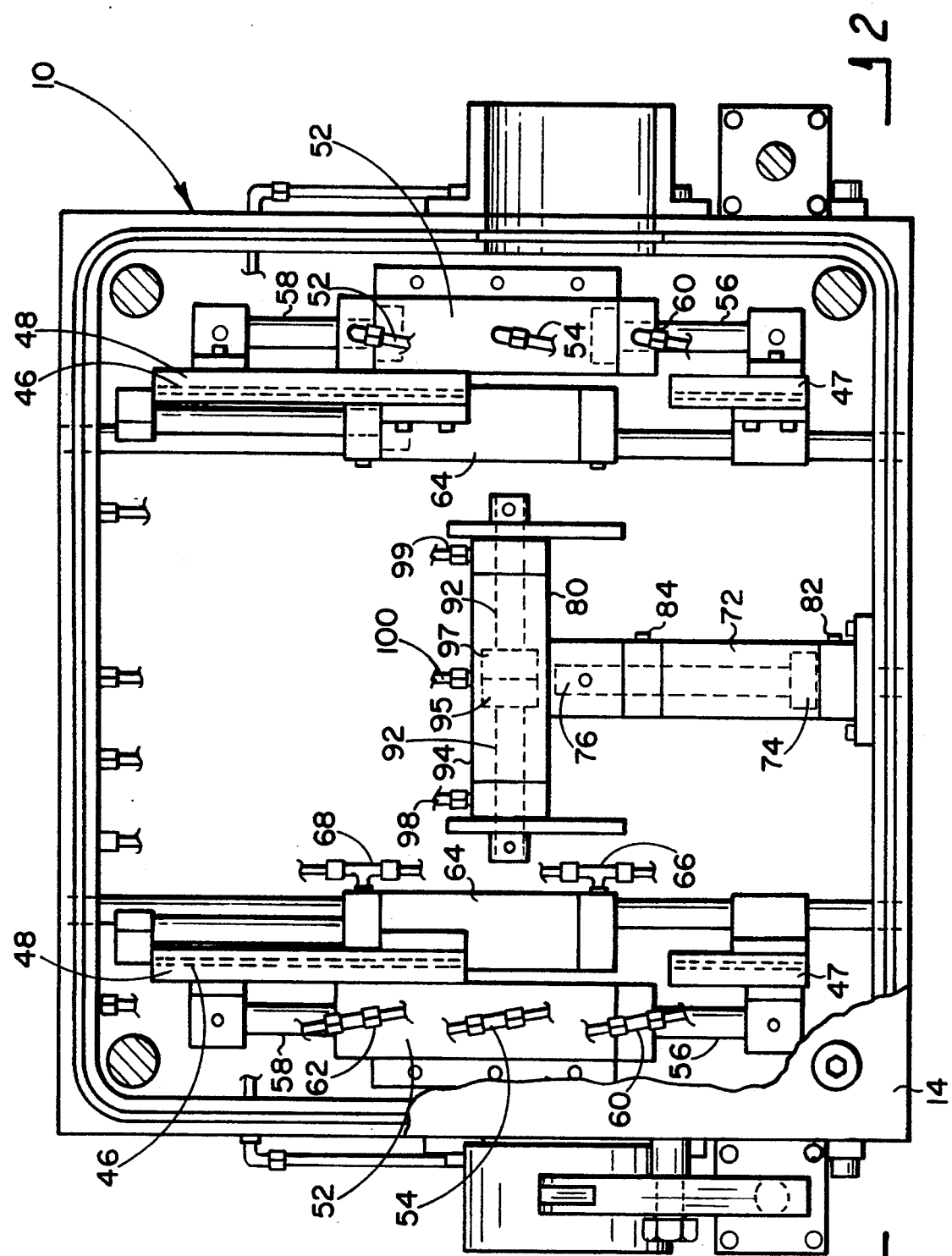
FIG. 1 is a simplified view with most of the top of the top section of the pressure vessel cut away to show the main components.

The device of this invention includes a pressure vessel that is used to enclose a defective section, or a section, of a pipe to be removed. A pressure vessel 10 includes a lower portion 12 and an upper portion 14 that are placed about the pipe section, and the two sections making up the upper section and lower section are provided with a seal 16 that makes it a pressure vessel.

Seal 16 not only seals the upper and lower portions of the vessel together but also provides a seal with the pipe that is to be repaired. As shown in the drawings, bolts 18 holds the upper and lower sections together in a conventional manner.

Figure 5:
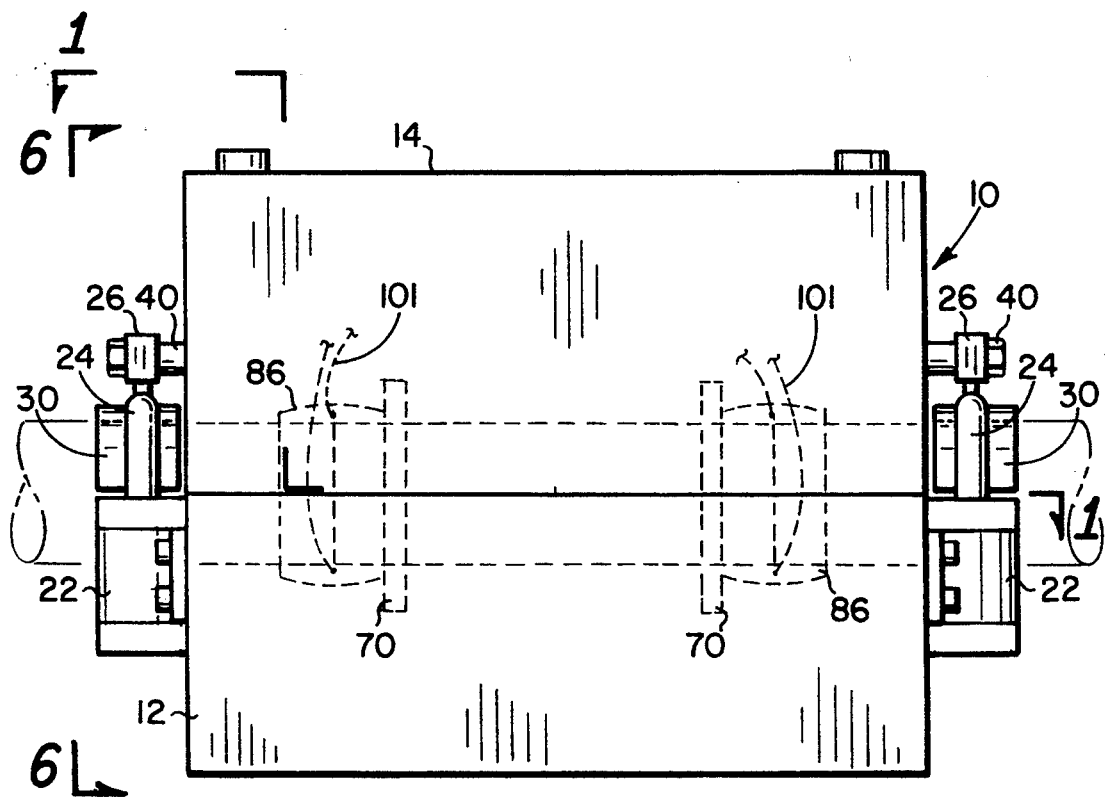
FIG. 5 is a front elevation of the pressure vessel assembled and showing in dotted outline an inserted pipe repair section.
Figure 6:
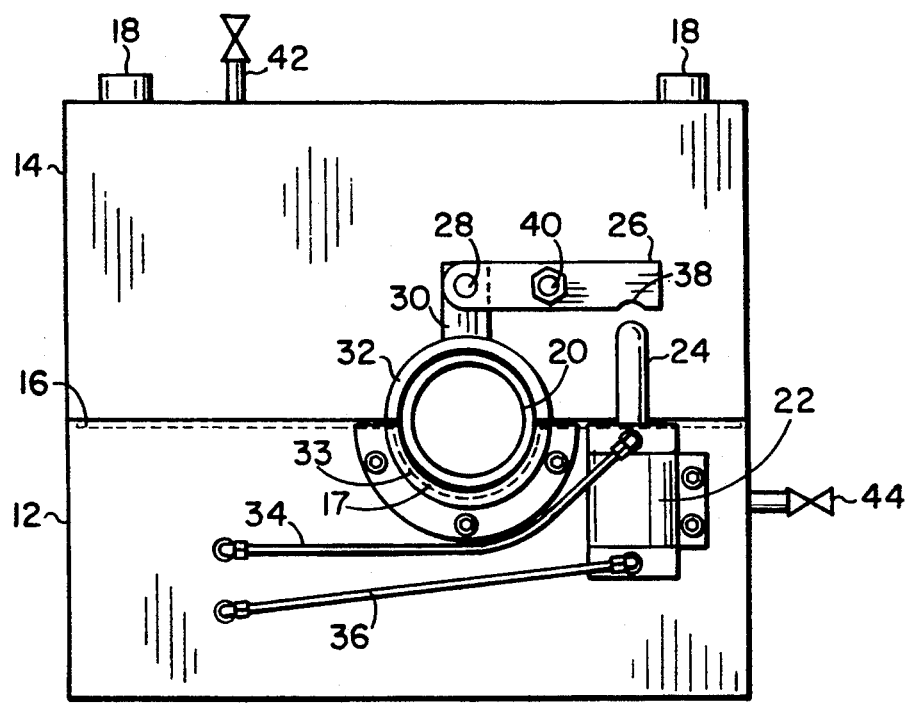
FIG. 6 is a view taken along the line 6—6 of FIG. 5.

As shown most clearly in FIG. 6, means for forcing seal 16 against a pipe 20 is provided. This includes a pipe clamp hydraulic cylinder 22 supported from bottom section 12 and is provided with hydraulic fluid through lines 34 and 36 respectively for driving the piston within cylinder 22 in opposite directions. The cylinder is provided with a pin 24 connected to the piston in cylinder 22 and fits into notch 38 of lever 26. Lever 26 is pivoted about pivot point 40 that is supported from top section 14. The end opposite the notch of lever 26 is connected to a stem 30 through pivot 28. Stem 30 is secured to clamp shell 32. The upward movement of pin 24 causes clamp shell 32 to move downwardly and forces clamp shell 32 tightly against the pipe to retain the pipe within pressure vessel 10 and prevent leakage at seals 16 and 17. There is a lower clamp shell 33 secured to lower section 12. As shown in FIG. 5, a similar clamp shell system is on the other end of pressure vessel 10. There is also provided a fluid inlet 42 and a fluid outlet 44 on pressure vessel 10 so that once seals 16 are effected, fluid can either be directed into or permitted to escape from the interior of pressure vessel 10 or both valves can be shut.

After the pipe section to be repaired has been fully clamped and sealed within pressure vessel 10 the next step is to cut out the desired portion of the pipe. The means for doing that will next be discussed. This includes two cutting knifes 46, one positioned near each side of the pressure vessel. The knives 46 are within knife guide and clamp 48. Knife guide 48 has a mostly semi-circular shaped portion 50 that when activated to its operating position will fit snugly against the pipe. A second knife clamp 47 with semicircular portion 51 is also driven by drive-acting cylinder 52. In other words, the contour of knife portions 50 and 51 is essentially the same as that of the pipe that is to be cut in two and when activated serves to hold the pipe in place during cutting operations.

Before a cutting operation commences, knife guide 48 and knife clamp 47 are placed in position so that semicircular sections 50 and 51 are against the pipe to be repaired. This acts as an alignment for knife 46. The means for driving this is hydraulic cylinder 52 having shafts 56 and 58. As seen in FIG. 1, double pistons 54 are provided with arms 56 and 58 that are connected respectively to guides 47 and 48. There is provided fluid pressure connections 60 and 62. When fluid pressure is exerted in these two, the pistons are driven such that guide clamps 47 and 48 are driven toward the transport pipe. A pressure fitting 54 is provided so that when fluid under pressure is inserted therein, it causes the two internal pistons to be driven apart, thereby driving guide heads 47 and 48 apart and in a direction away from the transport pipe.

When guides 47 and 48 are driven so that sections 50 and 51 clamp the pipe, then the next step is to activate the cutting of the pipe in two at the two spots indicated by the lateral positions of knifes 46. This is accomplished by activating cylinder 64 with guide shaft 49 and power fluid inlet and outlet 66 and 68 respectively. By activating cylinder 64 to drive knife blades 46 along their respective guides the pipe is cut into in two places. When the two cuts have been completed the cutting knife is retracted. Also retracted are knife guides 47 and 48. As soon as they are retracted the section of pipe that has been cut out of the pipeline drops by gravity into a lower portion of the pressure vessel.

Now that the defective section has been cut out, the next step is to effect the repair of or placement of a replacement fitting within the pipe. Means for providing this will next be discussed.

Figure 2:
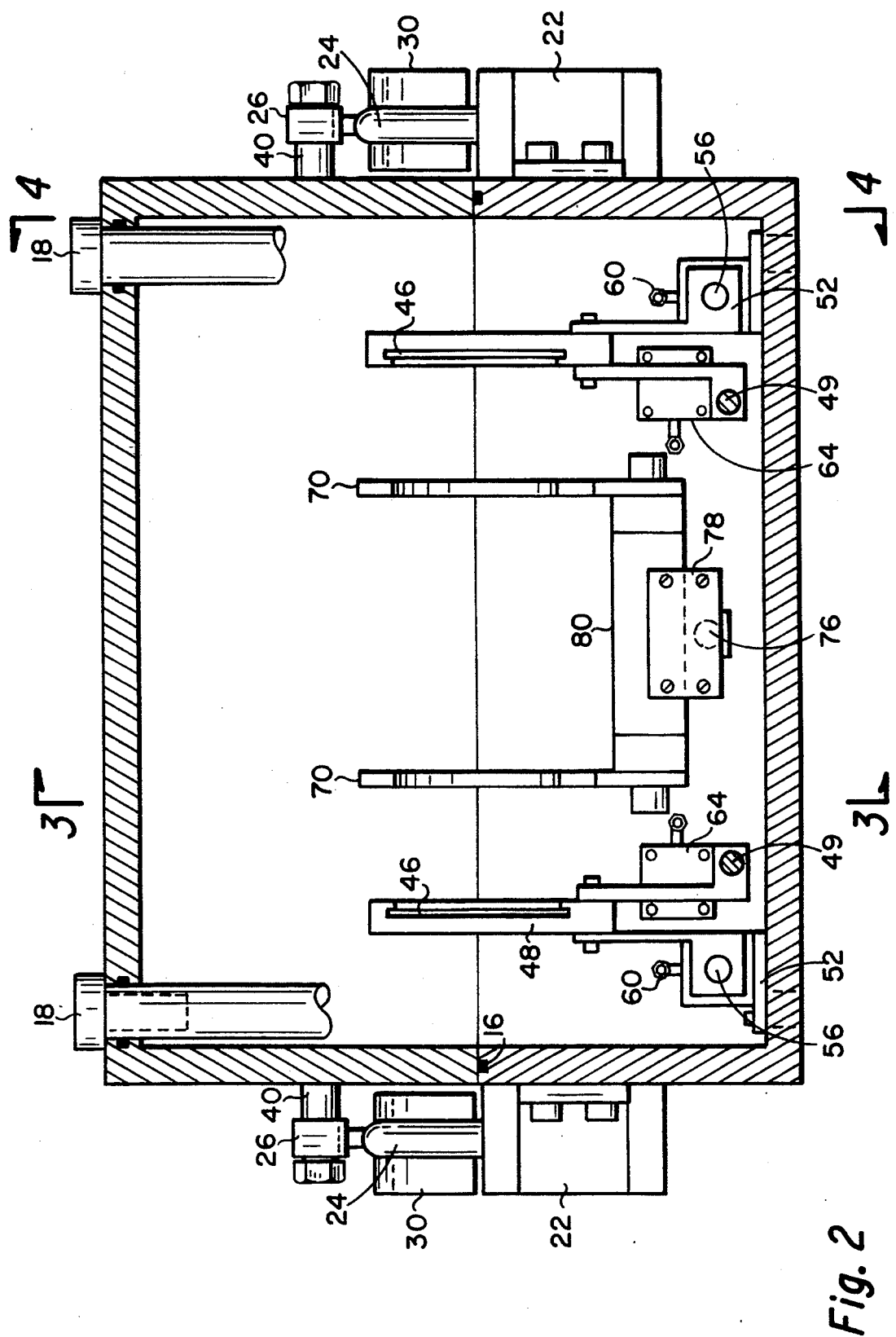
FIG. 2 is a view taken along the line 2—2 of FIG. 1.
Figure 3:
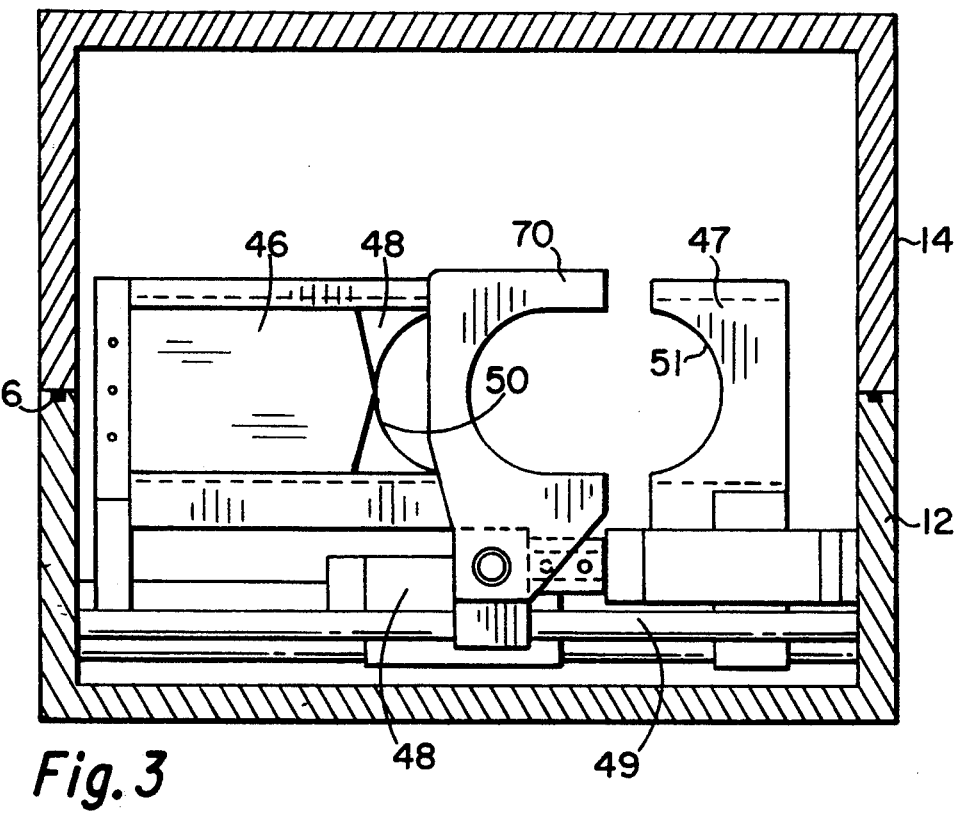
FIG. 3 is a sectional view taken along the line 3—3 of FIG. 2.
Figure 4:
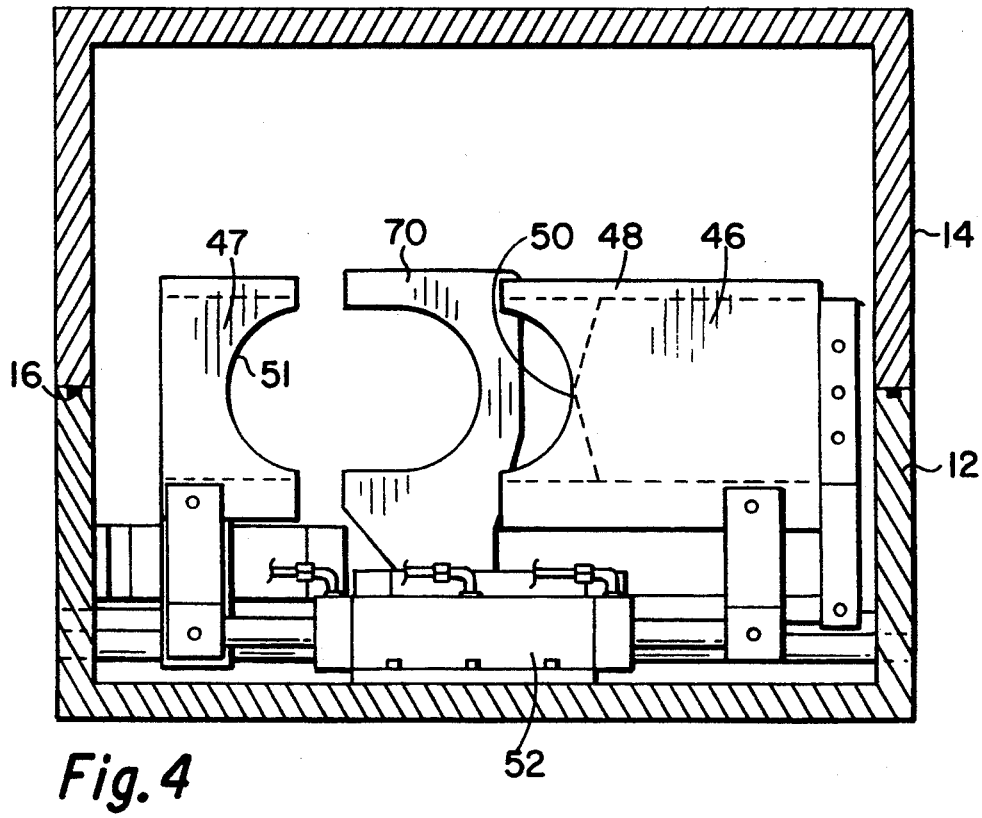
FIG. 4 is a sectional view taken along the line 4—4 of FIG. 2.

Before pressure vessel 10 was connected together, the replacement section was positioned on placement arms 70. Means are provided so that the placement arm holders can be moved selectively in a direction perpendicular to the pipe being repaired and in an axial motion in which the two arms are moved apart. Means for obtaining the perpendicular motion will next be discussed. This includes a shaft hydraulic cylinder 72 that has piston 74 with shaft 76. The shaft 76 is connected to mounting block 78 as shown more clearly in FIG. 2. The mounting block 78 is secured to and supports arm hydraulic cylinder 80 that, in turn, supports the fitting placement arms 70. Thus by applying hydraulic fluid pressure through connection 82, the fitting placement arms 10 are driven toward the center of the pressure vessel. The extension of the cylinder is such that when fully extended it causes the axis or center of the replacement nipple to be aligned with the axis original pipe. Hydraulic cylinder 70 also has a fitting 84. When it is desired to retract the piston 74 fluid is added to this fitting.

As shown in FIG. 5, arms 70 are also placed adjacent and between fusion collars 86. Once the fitting or replacement section has been positioned between the two cutoff ends, it is necessary to seal the two sections to the inserted fitting. The two fusion collars 88 are then driven laterally by arms 70 until they fit over the joint where the fitting meets with the cut portion of the pipe as shown in dotted lines of FIG. 5.

Referring back to FIG. 1, double acting hydraulic cylinder 94 is provided with arms 92 and 93 driven by pistons 95 and 97. Rods 92 are connected to arms 70 and when fluid is injected under pressure through fittings 98 and 99, the arms are driven to the interior of the cylinder to the position shown in FIG. 1. When power fluid is connected through fitting 100 arms 92 and 93 are driven outwardly to the position indicated in FIG. 5. Thus, it is seen that hydraulic cylinder 72 is for driving arms 70 in a direction perpendicular to the axis of the pipe being repaired, and cylinder 94 drives the arms either laterally in a direction parallel to the axis of the pipe being repaired. After the pipe has been cut and the cutout section is dropped out of the way, cylinder 72 is activated to drive the replacement fitting into alignment position with the pipe. Thereafter cylinder 94 is activated to drive the arms 70 outwardly, pushing collars 86 to the position shown in FIG. 5 so that they enclose the contacts of the ends of the fitting and the ends of the transport pipe as illustrated in FIG. 5. When this has been accomplished, there are provided electrical connections 101 that go to a switch and power source (not shown) so that, at this time, the operator can energize collars 86 and cause the collars to fuse with the transport pipe and the insert fitting or nipple to create a leak proof joint.

If it is desired, one can use inlet conduit and valve 42 and outlet conduit and valve 44 to purge the interior of the vessel of the existing air after the pressure vessel has been sealed to the pipe. One may inject nitrogen and drive out the air so that there is no explosive mixture in the vessel.

After collars 86 have been energized and the pipe and the insert are fused, then pressure can be released from the pressure vessel by opening either valves 42 and/or 44. Then cylinder 22 is pressurized through conduit 34 to drive rod 24 away from lever 26. This releases the pressure of clamp shell 32. Then by unbolting bolts 18 the vessel can be separated from the upper part and the lower part so that it can be removed from the pipeline. At this time, the replacement section has been effectively placed into the existing pipeline without removing the pressure on the transport pipeline itself.

Although the discussion was centered around repairing a leak in the pipeline this method can also be used to prepare an outlet. In this case the replacement section or fitting can well be a "T" joint in which the stem of the "T" would be provided with a valve mechanism so that a fluid take-off fitting can be provided.

The claims and the specification describe the invention presented and the terms that are employed in the claims draw their meaning from the use of such terms in the Specification. The same terms employed in the prior art may be broader in meaning than specifically employed herein. Whenever there is a question between the broader definition of such terms used in the prior art and the more specific use of the terms herein, the more specific meaning is meant.

While the invention has been described with a certain degree of particularity it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. A method of repairing a transport pipe having a selected section and having fluid therein under pressure comprising:

enclosing the selected section of the pipe in a pressure container;

cutting said selected section out of said pipe while said container is under pressure and leaving a space between cut ends of said pipe within said container;

placing a replacement nipple within said space, said nipple supporting two electrofusion collars, said nipple being of a length to fit into said space;

moving said collars axially along said nipple to fit over the position where said collars and the ends of said transport pipe meet; and energizing said collars to fuse said transport pipe with said nipple to create a leakproof joint.

* * * * *